United States Patent [19]

Baker et al.

[11] 4,270,881
[45] Jun. 2, 1981

[54] PRODUCE HANDLING SYSTEM

[76] Inventors: Benjamin R. Baker, Rte. 1, Norman Park, Ga. 31771; Mickey C. Baker, Rte. 2, Moultrie, Ga. 31768

[21] Appl. No.: 88,950

[22] Filed: Oct. 29, 1979

Related U.S. Application Data

[62] Division of Ser. No. 876,887, Feb. 13, 1978, Pat. No. 4,173,422.

[51] Int. Cl.³ .................... B65G 67/08; B65G 15/08
[52] U.S. Cl. .................................. 414/398; 198/823
[58] Field of Search ................ 414/390, 398, 574; 198/302, 313, 823, 824, 864

[56] References Cited

U.S. PATENT DOCUMENTS

| | | | |
|---|---|---|---|
| 1,850,891 | 3/1932 | Nyborg | 198/823 |
| 2,646,162 | 7/1953 | Brunsvold | 414/398 X |

*Primary Examiner*—Robert G. Sheridan
*Attorney, Agent, or Firm*—B. J. Powell

[57] ABSTRACT

The invention is a produce handling system with a self-unloading trailer and a free-standing conveyor. The trailer has an unloading conveyor in its bottom covered by removable doors. The free-standing conveyor has an infeed section that receives the produce from the trailer unloading conveyor pivoted to an out feed section which delivers the produce from the infeed section to a stacking position such as a truck.

8 Claims, 12 Drawing Figures

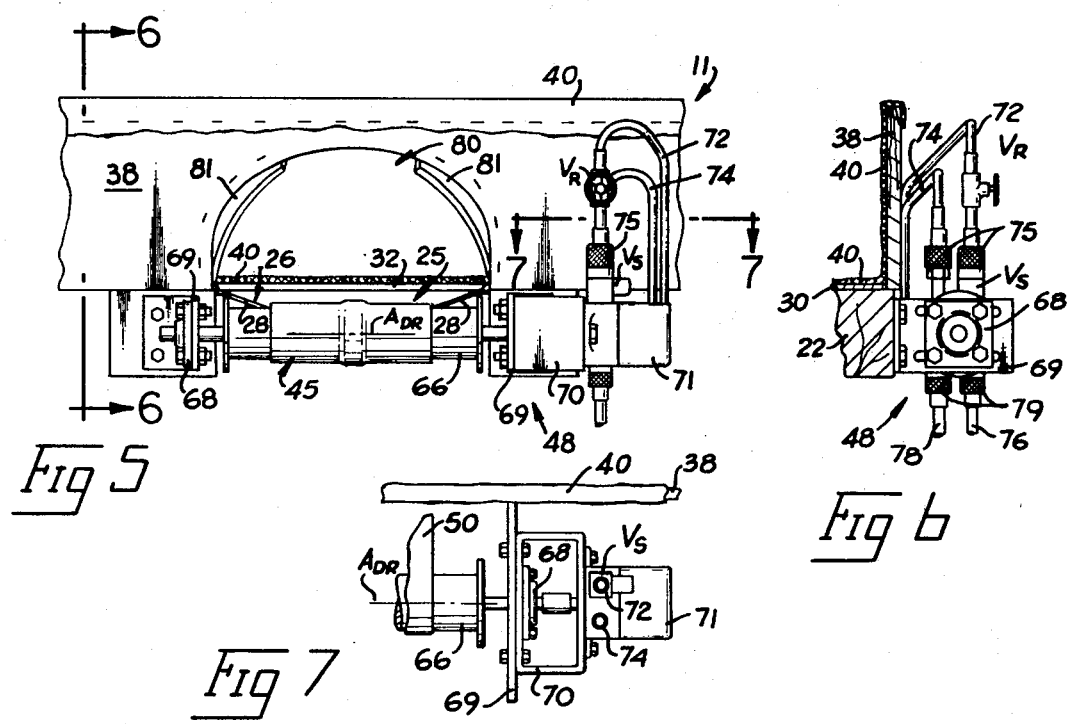
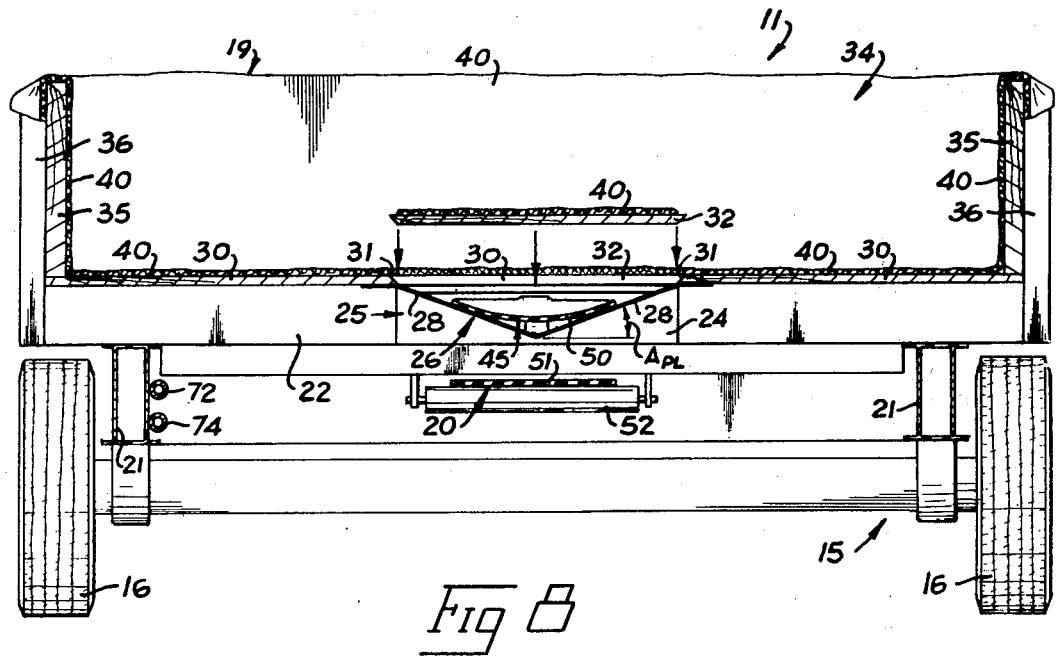

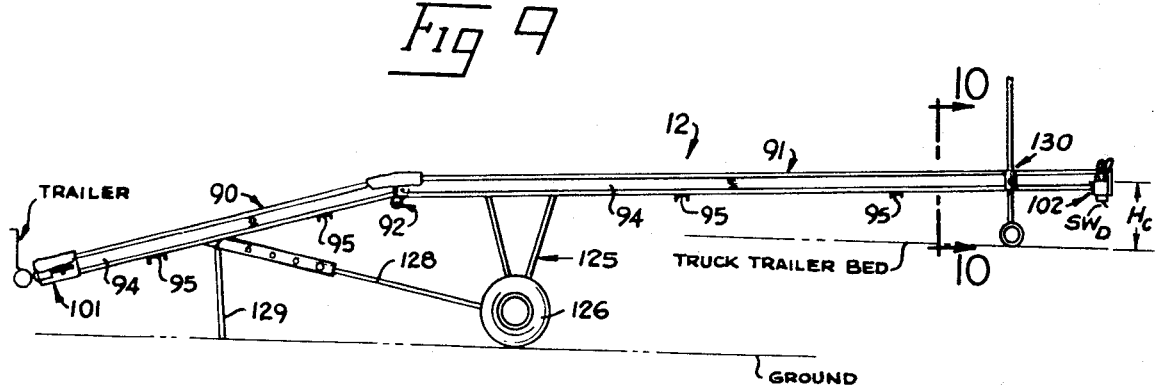
Fig 9
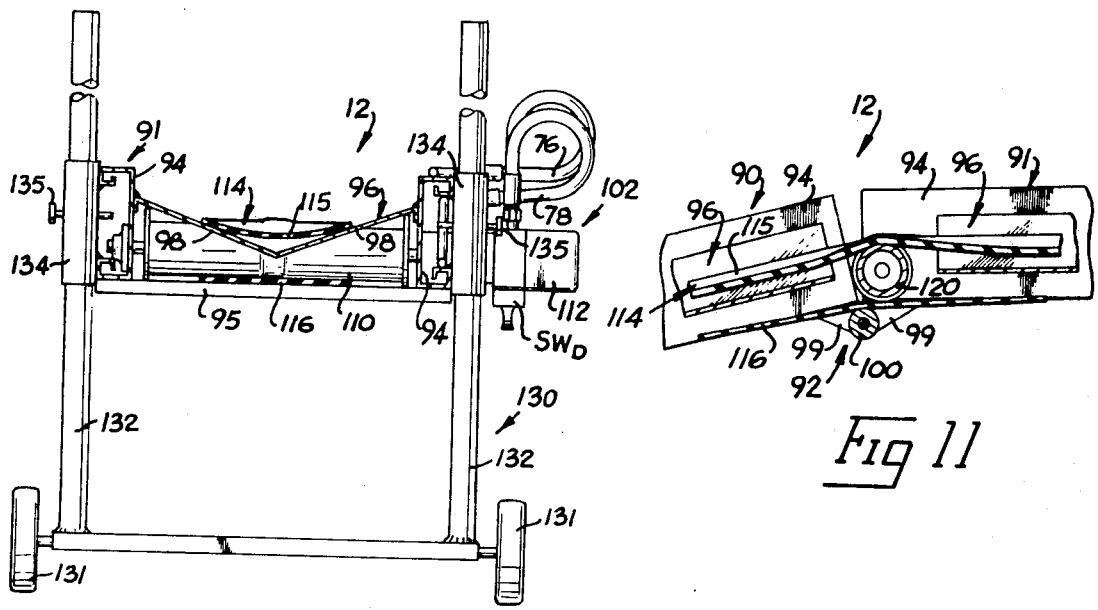
Fig 10
Fig 11
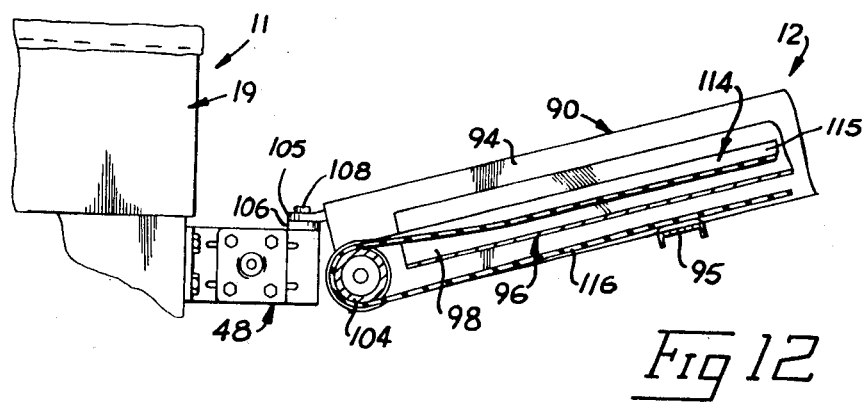
Fig 12

PRODUCE HANDLING SYSTEM

CROSS REFERENCE TO RELATED APPLICATION

This application is a division of my co-pending application Ser. No. 876,887, filed Feb. 13, 1978, now U.S. Pat. No. 4,173,422.

BACKGROUND OF THE INVENTION

Material handling systems incorporating conveyors, both of the free standing type and as part of trailers or other container vehicles, are in common use today. While these material handling systems have been relatively successful in handling materials that are relatively durable and thus not easily damaged, they have generally been unsuccessful in handling relatively fragile produce, especially relatively heavy produce such as watermelons, cantaloupes and the like.

SUMMARY OF THE INVENTION

These and other problems and disadvantages associated with the prior art are overcome by the invention disclosed herein by the provision of a material handling system capable of handling a wide variety of materials including relatively heavy fragile produce such as watermelons, cantaloupes and the like without damage thereto. The system of the invention is extremely simple in construction yet significantly facilitates both the field harvesting operation of the produce and the loading of trucks to haul the produce to market.

The apparatus of the invention includes a self unloading trailer and a free standing conveyor. The trailer has a trailer frame with ground engaging wheels; a bed on the frame with a produce receiving bin and a conveyor channel along the bottom of the bin; and a trailer unloading conveyor mounted in the conveyor channel with a V-shaped pan extending along the length of the conveyor channel, a trailer idler unit at one end of the conveyor channel, a trailer drive unit at the opposite end of the conveyor channel and an endless conveyor belt extending over the V-shaped pan and around the idler unit and drive unit so that the V-shaped pan supports the conveyor belt along opposite edges thereof with the conveyor belt forming a natural catenary shape not in contact with the V-shaped pan between the opposed edges of the conveyor belt to cushion the produce on the conveyor belt as the conveyor belt moves the produce from the produce receiving bin.

The free-standing conveyor has an infeed section with spaced apart, longitudinally extending side members, a plurality of transversely extending cross members connecting the side members at longitudinally spaced positions, and a V-shaped pan extending along the length of the infeed section between the side members over the first cross members; an outfeed section with spaced apart, longitudinally extending side members, a plurality of transversely extending cross members connecting the side members at longitudinally spaced positions, and a V-shaped pan extending along the length of the outfeed section between the side members over the cross members; a pivot joint connecting one end of the infeed section to one end of the outfeed section so that the longitudinal axes of the infeed and outfeed sections are generally laterally aligned and so that the infeed and outfeed sections can be pivoted with respect to each other; and idler unit at one end of the free standing conveyor; a drive unit at the opposite end of the free standing conveyor; a transfer idler unit at the pivot joint; and an endless conveyor belt extending along the length of the infeed V-shaped pan, over the transfer idler unit, along the length of the outfeed V-shaped pan, around the drive unit, and around the idler unit so that the V-shaped pans support the conveyor belt along opposite edges thereof with the conveyor belt forming a natural catenary shape not in contact with the V-shaped pans between the opposed edges of the conveyor belt to cushion the produce on the conveyor belt as the conveyor belt moves the produce along the length of the free standing conveyor.

These and other features and advantages of the invention will become more clearly understood upon consideration of the following description and accompanying drawings wherein like characters of reference designate corresponding parts throughout the several views and in which:

BRIEF DESCRIPTION OF THE DRAWINGS

FIG. 5 is an enlarged portion of the rear end of the trailer taken along line 5—5 in FIG. 2;

FIG. 6 is a partial cross-sectional view taken along line 6—6 in FIG. 5;

FIG. 7 is an enlarged view taken generally along line 7—7 in FIG. 5;

FIG. 8 is a transverse cross-sectional view of the trailer taken along line 8—8 in FIG. 2;

FIG. 9 is a side elevational view of the free standing conveyor of the invention;

FIG. 10 is an enlarged cross-sectional view taken along line 10—10 in FIG. 9;

FIG. 11 is an enlarged longitudinal cross-sectional view of the conveyor of FIG. 9 at the pivot joint; and FIG. 12 is an enlarged longitudinal cross-sectional view of the infeed end of the conveyor of FIG. 9.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
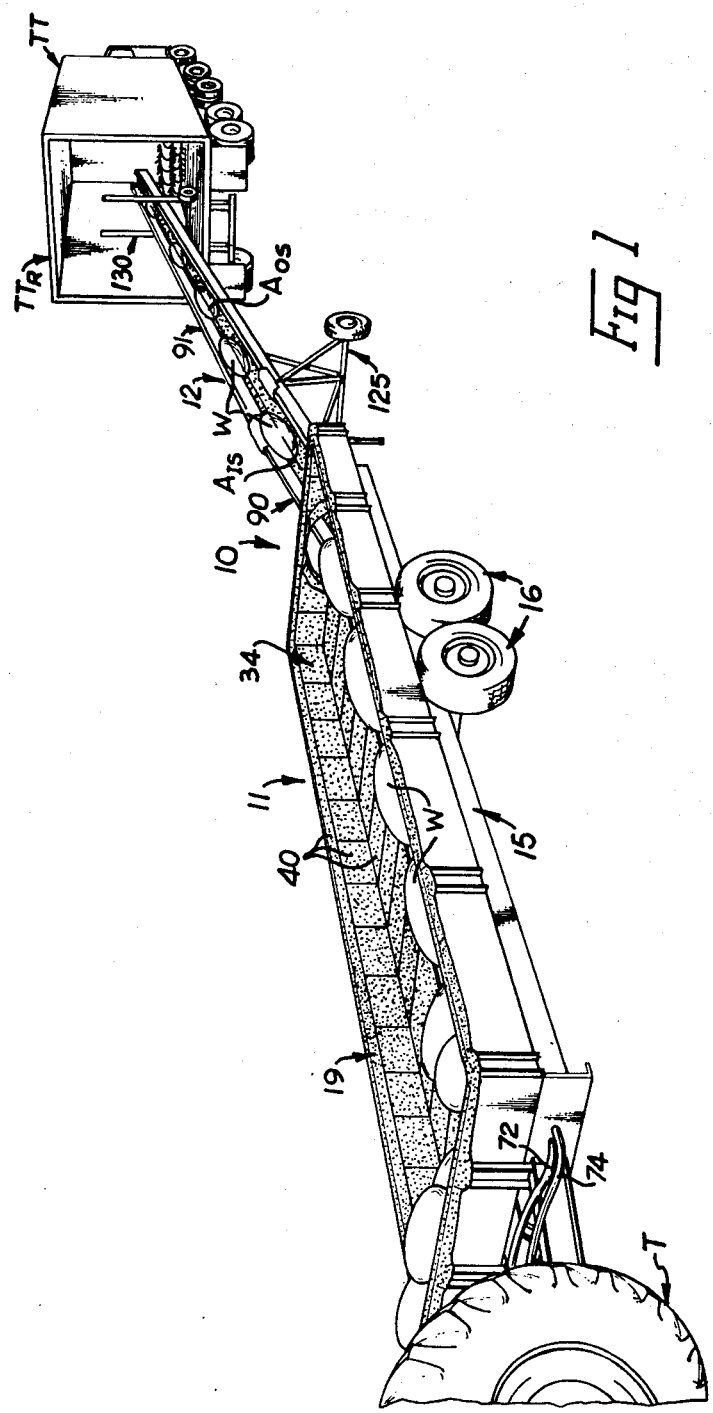
FIG. 1 is a perspective view illustrating the invention in use.
Figure 2:
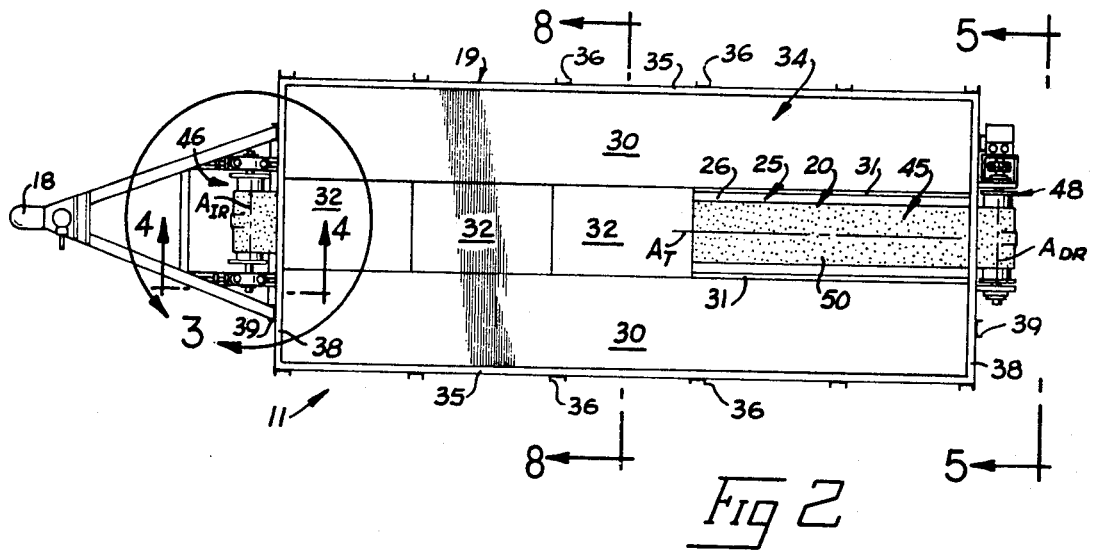
FIG. 2 is a top plan view of the trailer of the invention.
Figure 3:
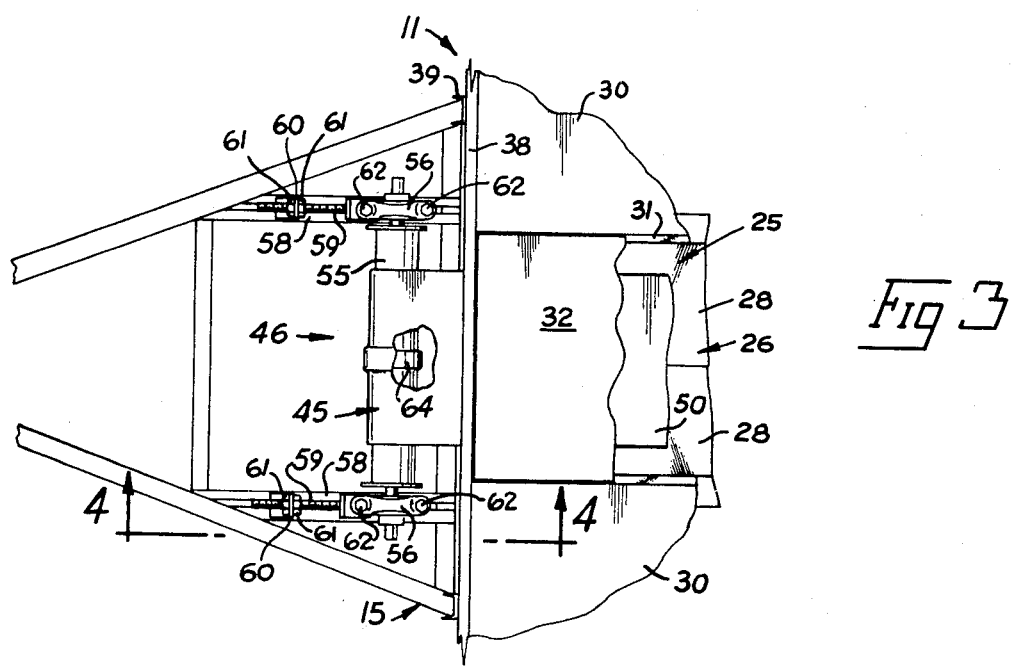
FIG. 3 is an enlarged view of that portion of the trailer enclosed by line 3 in FIG. 2.

Referring to FIG. 1, it will be seen that the inventive concept is incorporated in a produce handling system 10 which includes a self-unloading trailer 11 and a free-standing truck conveyor 12. The trailer 11 is usually towed by a farm vehicle such as farm tractor T partly seen in FIG. 1 while the conveyor 12 is used to load or unload any transporting vehicle such as the tractor-trailer truck TT also seen in FIG. 1.

The self-unloading trailer 11 is best seen in FIGS. 1–8 with a longitudinal axis $A_T$ and includes a trailer frame 15 with trailer wheels 16 and a hitch 18 so that the trailer 11 can be hitched to a farm vehicle such as tractor T and towed. The frame 15 mounts a produce carrying bed 19 thereon with an unloading conveyor 20 thereunder to unload the produce from the bed 19.

The bed 19 is mounted on longitudinal frame side members 21 and has several bed cross members 22 carried on members 21 (FIG. 8). Each of the bed cross members 22 has a central, upwardly opening conveyor cutout 24 with the cutouts 24 in the cross members 22 being aligned along the trailer axis $A_T$ to form a conveyor channel 25 along the length of the bed 19. A V-shaped conveyor support pan 26 (FIG. 8) is mounted in channel 25 and supported by cross members 22 adjacent cutouts 24. The pan 26 extends along the length of bed 19 with each leg 28 thereof defining an angle $A_{PL}$ with the horizontal as will become more apparent. Fixed floor members 30 extend along the length of bed 19 over cross members 22 from the conveyor channel 25 out to the side edges of the bed. The inside edge 31 of floor members 30 adjacent channel 25 are beveled (FIG. 8) at about the same angle as legs 28 on pan 26. The channel 25 is selectively covered by removable doors 32 so that doors 32 form a continuation of the floor members 30 when in place. On the other hand, the doors 32 can be removed to open up the conveyor channel 25 during unloading. The outer side edges of the bed 19 are provided with upstanding side walls 35 supported by side stanchions 36 on cross members 22 while the opposite ends of bed 19 are provided with upstanding end walls 38 carried by end stanchions 39 on cross members 22. The floor members 30, side walls 35, and end walls 38 define a produce receiving bin 34 therebetween. The inside surfaces of floor members 30, side walls 35, end walls 38 and doors 32 are covered with padding 40 such as a carpeting material to prevent damage to the produce carried in the bed 19 as will become more apparent.

Figure 4:
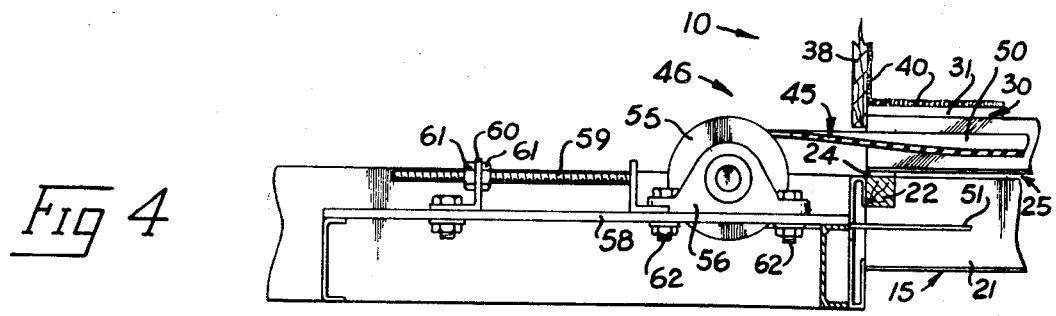
FIG. 4 is an enlarged cross-sectional view taken along line 4—4 in FIG. 3.

The unloading conveyor 20 includes an endless conveyor belt 45 extending along conveyor channel 25 trained over an idler unit 46 (FIGS. 2-4) and a drive unit 48 (FIGS. 2 and 5-7). While the location may be reversed, the idler unit 46 is shown at the front end of trailer 11 while the drive unit 48 is shown at the rear end of the trailer. The conveyor belt 45 has a width less than the width of channel 25 and is made out of conventional belting material sufficiently strong to be supported along its outer edges with its central section forming a natural catenary curve (FIG. 8). The angles $A_{PL}$ of the pan legs 28 are selected so that the legs 28 conform generally to the catenary shape of the belt 45 along its outer edges but clear the center of the belt 45. This allows the belt to cushion the produce as it is carried thereby to prevent damage thereto. The weight of the produce may distort the natural catenary transverse shape of belt 45, but the central section of the belt will always clear the pan 26 to provide the cushion effect while at the same time reducing the power necessary to drive the belt 45. The upper flight 50 of belt 45 thus rides on top of pan 26 while the lower flight 51 passes under the pan on idlers 52 (FIG. 4).

The idler unit 46 (FIGS. 3, 4) has an idler roller 55 rotatably journalled in bearing blocks 56 about axis $A_{IR}$. Each of the bearing blocks 56 is movably mounted on longitudinally extending slide rails 58 fixedly mounted on the trailer frame 15 forwardly of bed 19. A slide screw 59 connects each bearing block 56 to a locating tab 60 longitudinally fixed on slide rail 58 through positioning nuts 61 so that each of the bearing blocks 56 can be longitudinally adjusted along slide rails 58 independently of each other by manipulating nuts 61. The hold down bolts 62 on bearing blocks 56 are used to lock blocks 56 in position. This permits both the tension in belt 45 and its tracking on idler roller 55 to be adjusted. A raised annular centering band 64 (FIG. 4) may be provided around roller 55 to help keep conveyor belt 45 centered thereon.

The drive unit 48 (FIGS. 5-7) has a drive roller 66 rotatably journalled in bearing blocks 68 about axis $A_{DR}$ generally normal to the trailer axis $A_T$ at the rear end of trailer 11. The off side bearing block 68 is adjustably mounted on one of the mounting brackets 69 on the rear bed cross member 22 (FIG. 6) while the rear bearing block 68 is fixed to a tubular D-shaped carriage bracket 70 (FIG. 7) which is in turn adjustably mounted on the other mounting bracket 69. A fluid drive motor 71 is affixed to the outside of carriage bracket 70 with its drive shaft coaxial with the shaft of roller 66 and is coupled to roller 66 within carriage bracket 70 to drive roller 66. The roller 66 may also have a raised centering band similar to roller 55 to facilitate belt tracking. Thus, roller 66 can also be adjusted to tension belt 45 and control tracking.

The drive motor 71 is connected to an appropriate pressurized fluid source to drive same. One such source is the auxiliary hydraulic system (not shown) of farm tractor T. FIGS. 5 and 6 show a high pressure line 72 and a return line 74 connected to motor 71 through quick disconnect couplings 75 and to the tractor T as seen in FIG. 1. An adjustable regulating valve $V_R$ may be provided in the high pressure line 72 to regulate the speed of motor 71 and a solenoid control valve $V_S$ may also be provided to selectively enable and disable motor 71 as will become more apparent. Auxiliary high pressure line 76 and auxiliary return line 78 may be provided to connect other equipment to the hydraulic drive in parallel with motor 71 through quick disconnect couplings 79 as will become more apparent. The motor 71 drives the conveyor belt 45 so that its upper flight 50 moves from the front toward the rear of trailer 11.

The rear end wall 38 (FIG. 5) is provided with a central, generally semicircular opening 80 directly over the upper flight 50 of conveyor belt 45 so that produce moving rearwardly in bed 19 on the upper flight 50 can pass through the opening 80 in rear end wall 38 and out of bed 19. Appropriate padding 81 is provided around the opening 81 to prevent damage to the produce passing therethrough.

TRAILER OPERATION

The trailer 11 is used to transport the produce from a field harvesting operation to a central unloading point. While different kinds of produce can be handled by the trailer 11, its operation with watermelons W will be described as an example. The doors 32 are placed over the conveyor channel 25 to cover same and the trailer 11 towed to a field harvesting operation with the farm tractor T. The field workers pick the watermelons from the vines and place them in the bed 19 of trailer 11. When the trailer is full, it is towed to a central unloading point such as that shown in FIG. 1. The rearmost door 32 in the loaded trailer 11 is removed and the fluid lines 72 and 74 connected to the tractor T so that motor 71 drives the upper flight 50 of conveyor belt 45 rearwardly in the bed 19 along channel 25. To unload the watermelons from bed 19, a worker simply rolls the watermelons into the conveyor channel 25 onto the moving upper flight 50 of belt 45. Because of the catenary cross sectional shape of belt 45 and the elongate shape of the watermelons W, the watermelons tend to align themselves so that their major axes are oriented generally parallel to the belt axis and longitudinal trailer axis $A_T$. The watermelons are carried rearwardly out of trailer 11 on the upper flight 50 of belt 45 through the opening 80 in rear end wall 38 and deposited on the free standing conveyor 12 as seen in FIG. 1 and as will become more apparent. As more of the doors 32 are uncovered during the unloading operation, they are removed to gain access to conveyor channel 25 and thus minimize the amount of movement required to get the watermelons onto the upper flight 50 of belt 45 moving along channel 25. Because watermelons are relatively heavy, normally about 15-30 pounds, the workers can operate the trailer 11 without the early fatigue normally associated with prior art harvesting operations.

FREE STANDING CONVEYOR

The free standing truck conveyor 12 (FIGS. 1 and 9-12) receives the produce from the rear end of trailer unloading conveyor 20 and transports same to a discharge point, shown as the interior of a trailer $TT_R$ of a tractor-trailer truck TT in FIG. 1. The conveyor 12 may be used to transport the produce to any convenient discharge point and may likewise be used to unload trailer $TT_R$.

The conveyor 12 has an infeed section 90 pivotally connected to an outfeed section 91 so that sections 90 and 91 have laterally aligned longitudinal axes $A_{IS}$ and $A_{OS}$ (FIG. 1) that pivot about the pivot joint 92 (FIGS. 9 and 11) between sections 90 and 91 at which axes $A_{IS}$ and $A_{OS}$ intersect. Each of the conveyor sections 90 and 91 have a similar cross sectional shape with a pair of opposed, U-shaped side channels 94 (FIG. 10) extending along the length of each section 90 and 91 which are held in a parallel, spaced apart position by a plurality of cross channels 95 (FIG. 10) at longitudinally spaced apart positions along the length of each section 90 and 91. A V-shaped conveyor support pan 96 (FIG. 10) similar to pan 26 in trailer 11 extends along the length of each conveyor section 90 and 91. The legs 98 (FIG. 10) of pan 96 are angled similarly to legs 28 on pan 26 and serve the same purpose. The pivot joint 92 between sections 90 and 91 is a pair of hinges 99 (FIG. 11) mounted between each pair of side channels 94 which also serve to mount a conveyor belt return idler 100 therebetween as will become more apparent. The infeed end of section 90 of conveyor 12 mounts an idler unit 101 (FIGS. 9 and 12) while the discharge end of outfeed section 91 of conveyor 12 mounts a drive unit 102 (FIGS. 9 and 10).

The idler unit 101 has an idler roller 104 (FIG. 12) similar to roller 55 rotatably mounted about an axis generally normal to the infeed section axis $A_{IS}$. Roller 104 is adjustable similar to roller 55 to control belt tension and tracking. The infeed end of section 90 may also have a pair of hitches 105 (FIG. 12) which can be pinned to appropriate plates 106 on the drive unit 48 on trailer 11 with pins 108 so that the proper spacing between the infeed end of conveyor 12 and the discharge end of the trailer unloading conveyor 20 can be maintained to assure smooth transfer of the produce from trailer 11 to conveyor 12.

The drive unit 102 is similar in construction to drive unit 48 on trailer 11 with drive roller 110 (FIG. 10) driven by fluid drive motor 112 about an axis generally normal to the outfeed section axis $A_{OS}$. The roller 110 is also adjustable to control belt tension and belt tracking. An endless conveyor belt 114 extends along the length of conveyor 12 around rollers 104 and 110 so that its upper flight 115 is moved along pans 96 from the infeed end of conveyor 12 to its discharge end.

A transfer idler roller 120 (FIG. 11) is rotatably mounted between the side channels 94 at the pivot joint 92 so that the upper flight 115 of belt 114 passes smoothly over the joint between sections 90 and 91. The lower return flight 116 of belt 114 passes over the cross channels 95 (FIG. 12) and the return idler 100 (FIG. 11). Rollers 104, 110 and 120 may be provided with a raised central band as rollers 55 and 66 to assist in belt tracking.

The fluid drive motor 112 is connected to the hydraulic auxiliary power supply from the farm tractor via the auxiliary lines 76 and 78 (FIG. 10) connected in parallel with trailer conveyor motor 71 (FIGS. 5 and 6). A disabling switch $SW_D$ (FIG. 10) is provided at the discharge end of the outfeed section 91 so that a workman can activate same to cause solenoid valve $V_S$ (FIGS. 5-7) to stop the operation of motors 71 and 112 as will become more apparent.

The conveyor 12 is mounted on a base carriage 125 (FIGS. 1 and 9) with ground engaging wheels 126 rotatable about a common axis normal to the conveyor axes $A_{IS}$ and $A_{OS}$ so that conveyor 12 can be towed into position. The base carriage 125 is fixed to the outfeed section 91 and connected to the infeed section 90 through an adjustable link 128 (FIG. 9) to permit the sections 90 and 91 to pivot about joint 92. An appropriate stand 129 (FIG. 9) may be provided to stabilize the conveyor 12.

The discharge end of the outfeed section 91 is positioned by a supplemental carriage 130 (FIGS. 1, 9 and 10). The supplemental carriage 130 has bed engaging wheels 131 and a pair of upright posts 132. The discharge end of section 91 is adjusted along posts 132 via slide tubes 134 on section 91 and pins 135 that extend through appropriate holes in the posts 132. The bed engaging wheels 131 roll along the surface on which the unloading workers stand such as the truck bed in trailer $TT_R$ with the carriage 130 adjusting the discharge end of section 91 above the truck bed as will become more apparent.

FREE STANDING CONVEYOR OPERATION

While the free standing conveyor 12 may be used to transport produce between any two locations, it is especially designed to transport produce from the trailer 11 to the trailer $TT_R$ of the tractor-trailer truck TT as seen in FIG. 1. The operation of conveyor 12 will be described as applicable to watermelons W as was the case with trailer 12. The wheels 131 on the supplemental carriage 130 are placed on the bed of trailer $TT_R$ and the conveyor 12 moved so that the discharge end of the outfeed section 91 is located in the vicinity of the interior of trailer $TT_R$ at which the watermelons W are to be stacked. The height $H_C$ (FIG. 9) of the discharge end of conveyor 12 is adjusted by manipulating the pins 135 in slide tubes 134 and posts 132 so that the watermelons are discharged therefrom at about waist high to the worker (normally called a catcher) receiving them.

Because watermelons are fragile, they are normally stacked in transverse layers as seen in FIG. 1 by a special worker commonly known as a stacker. Straw or some similar packing material is placed between the layers of watermelons to protect same. Thus, it will be seen that the catcher catches the watermelons moving off of the end of the conveyor 12 and passes them to the stacker for stacking. If something happens to prevent the catcher from keeping up with the watermelons moving up conveyor 12, he can activate switch $SW_D$ to stop conveyor 12 and also the unloading conveyor 20 in trailer 11. He can then deactivate switch $SW_D$ to again start conveyors 12 and 20.

After supplemental carriage 130 is in position, the rear end of trailer 11 is backed up to the forward end of infeed section 90 on conveyor 12 so that the trailer axis $A_T$ is generally laterally aligned with the conveyor axes $A_{IS}$ and $A_{OS}$. The pins 108 may be used to connect the hitches 105 on conveyor 12 to the plates 106 on trailer 11 as seen in FIG. 12. The auxiliary fluid lines 76 and 78 are connected through motor 71 (FIG. 5) while the fluid lines 72 and 74 are connected to the tractor T (FIG. 1).

The motors 71 and 112 are started so that the watermelons W are discharged rearwardly from the trailer conveyor belt 45 onto the forward end of the upper flight 115 of the free standing conveyor belt 114. The watermelons then travel up the infeed section 90 on belt 114, over the transfer idler roller 120, and then up the outfeed section 91 to the catcher on belt 114. As more layers of watermelons are laid in the trailer $TT_R$, the discharge point from conveyor 12 can be moved either by driving the trailer truck TT forwardly while conveyor 12 is not moved or by moving trailer 11 and conveyor 12 while the trailer $TT_R$ is not moved.

What is claimed as invention is:

1. In a produce handling system for relatively heavy fragile produce such as watermelons, cantaloupes and the like, a free standing conveyor comprising:

an infeed section including a first pair of spaced apart longitudinally extending side members defining a first conveyor channel therebetween along the length of said infeed section, a plurality of transversely extending first cross members connecting said first side members at longitudinally spaced positions, and a first support pan extending along the length of said infeed section between said first side members over said first cross members and having a generally V-shaped cross-sectional configuration transversely of said first conveyor channel so that said first support pan extends across the transverse width of said first conveyor channel;

an outfeed section including a second pair of spaced apart, longitudinally extending side members defining a second conveyor channel therebetween along the length of said outfeed section, a plurality of transversely extending second cross members connecting said second side members at longitudinally spaced positions, and a second support pan extending along the length of said outfeed section between said second side members over said second cross members and having a generally V-shaped cross-sectional configuration transversely of said second conveyor channel so that said second support pan extends across the transverse width of said second conveyor channel;

connection means connecting one end of said infeed section to one end of said outfeed section so that the longitudinal axes of said infeed and outfeed sections are generally laterally aligned;

an idler unit at one end of said free standing conveyor;

a drive unit at the opposite end of said free standing conveyor; and an endless conveyor belt extending along the length of said first V-shaped pan, along the length of said second V-shaped pan, around said drive unit, and around said idler unit so that said first and second support pans support said conveyor belt along opposite edges thereof when said conveyor belt is unloaded with said conveyor belt forming a natural catenary shape not in contact with said V-shaped pans between the opposed edges of said conveyor belt to cushion the produce being placed on said conveyor belt as conveyor belt moves the produce along said first and second conveyor channels so that said first and second support channels support those portions of said conveyor belt between the opposed edges of said conveyor belt distorted out of the catenary shape by the weight of the produce thereon to prevent damage to the produce as said conveyor belt supports and moves the produce along said free standing conveyor.

2. In the produce handling system as set forth in claim 1, wherein said free standing conveyor further includes base carriage supporting said infeed and outfeed sections intermediate the ends of said free standing conveyor; and a supplemental carriage connected to said outfeed section adjacent that end of said outfeed section opposite said infeed section so that said free standing conveyor is supported between said base carriage and said supplemental carriage.

3. In the produce handling system as set forth in claim 2 for use in loading the produce into a truck trailer bed wherein said base carriage includes ground engaging wheels and wherein said supplemental carriage includes trailer bed engaging wheels and adjustment means connecting said outfeed section to said supplemental carriage to selectively vary the spacing between said outfeed section and said trailer bed engaging wheels to adjust the height of that end of said outfeed section opposite said infeed section above the truck trailer bed.

4. In the produce handling system as set forth in claim 3 further including disabling means at that end of said outfeed section opposite said infeed section for selectively disabling said drive unit.

5. In the produce handling system as set forth in claim 1 wherein said connection means includes a pivot joint pivotally connecting said infeed and outfeed sections so that said infeed and outfeed sections can be pivoted with respect to each other.

6. In the produce handling system as set forth in claim 5 wherein said free standing conveyor further includes a transfer idler unit at said pivot joint between said first and second support pans and wherein said conveyor belt extends over said transfer idler unit as it moves from said first support pan to said second support pan.

7. In the produce handling system as set forth in claim 6 wherein said free standing conveyor further includes a base carriage supporting said outfeed section in the vicinity of said pivot joint; a supplemental carriage adjustably supporting said outfeed section adjacent that end opposite said pivot joint; and link means adjustably connecting said infeed section to said base carriage to selectively adjust the pivotal position of said infeed section relative to said outfeed section about said pivot joint.

8. In the produce handling system as set forth in claim 7 further including disabling means at that end of said outfeed section opposite said pivot joint for selectively disabling said drive unit.

* * * * *